(12) United States Patent
Burkhardt

(10) Patent No.: US 7,717,660 B1
(45) Date of Patent: *May 18, 2010

(54) DEVICE AND METHOD FOR LIFTING AND TRANSPORTING CONVENTIONAL HAY BALE FEEDERS WITH A ROUND HAY BALE

(76) Inventor: George Wayne Burkhardt, 11235 New Sulphur Springs Rd., San Antonio, TX (US) 78263

( * ) Notice: Subject to any disclaimer, the term of this patent is extended or adjusted under 35 U.S.C. 154(b) by 0 days.

This patent is subject to a terminal disclaimer.

(21) Appl. No.: 12/319,186

(22) Filed: Jan. 3, 2009

Related U.S. Application Data

(63) Continuation of application No. 11/328,273, filed on Jan. 9, 2006, now Pat. No. 7,473,066.

(60) Provisional application No. 60/643,102, filed on Jan. 11, 2005.

(51) Int. Cl.
*A01D 85/00* (2006.01)
*A24B 1/06* (2006.01)

(52) U.S. Cl. ........................ 414/24.5; 414/132; 414/910

(58) Field of Classification Search ........................ None
See application file for complete search history.

(56) References Cited

U.S. PATENT DOCUMENTS

| | | |
|---|---|---|
| 3,851,624 A | 12/1974 | Peak |
| 3,934,726 A | 1/1976 | Martin |
| RE29,291 E * | 7/1977 | Peak ........................ 119/60 |
| D245,984 S | 10/1977 | Priefert |
| 4,090,616 A | 5/1978 | Runyan et al. |
| 4,120,405 A | 10/1978 | Jones et al. |

(Continued)

OTHER PUBLICATIONS

Priefert Mfg. (P.O. Box 1540, 2630 South Jefferson Ave., Mount Pleasant, TX, 75456-1540) 2003 catalog, p. 29.

*Primary Examiner*—Gregory W Adams

(57) ABSTRACT

A device and method for lifting and transporting a conventional hay bale feeder in association with the directed movement of a round hay bale and for facilitating the placement of the feeder around the bale. The device can be removably attached to the feeder and consists of a lift arm assembly, a lift arm support assembly, and an anti-slide stabilizing assembly. The lift arm assembly includes a lift arm that is angled away from the top of the feeder to provide feeder lift. The lift arm support assembly acts as a brace to support the lift arm. The anti-slide stabilizing assembly limits rearward and side to side rocking movement of the feeder when lifted and transported, respectively. In alternate embodiments, the device is integrated into circular and multi-sided feeders during manufacture, forming single stand-alone units. The method of using the device includes moving the bale toward the lift arm using a tractor or other vehicle, tilting of the feeder in an upward direction as the lift arm contacts and slides up the bale, terminating the bale movement when the lift arm rests on top of the bale, moving the hay bale in the opposite direction causing the lift arm to penetrate into the bale and pull the feeder in unison with the bale, terminating the bale movement at the feeding location, and pushing the feeder down over the bale or pushing the bale into the feeder until the feeder falls to the ground with the bale inside. Moreover, the design of the device allows the lift arm to be pivoted toward and secured to the feeder for manual rolling of the feeder in the traditional manner.

5 Claims, 11 Drawing Sheets

U.S. PATENT DOCUMENTS

| | | |
|---|---|---|
| 4,275,985 A | 6/1981 | Schremmer |
| 4,288,191 A | 9/1981 | Lynch |
| 4,302,139 A | 11/1981 | Malish |
| 4,316,691 A | 2/1982 | Kucera |
| 4,318,653 A | 3/1982 | Benefield et al. |
| 4,330,231 A | 5/1982 | Brewer |
| 4,346,671 A * | 8/1982 | Wagner ................ 119/60 |
| 4,348,143 A | 9/1982 | Hedgespeth |
| 4,364,700 A | 12/1982 | Arabshian et al. |
| 5,135,343 A | 8/1992 | Wigness |
| 5,868,098 A | 2/1999 | Adams |
| 5,890,864 A | 4/1999 | Sloan |
| 6,045,314 A | 4/2000 | Greene |
| 6,209,488 B1 | 4/2001 | Wright |

\* cited by examiner

DEVICE AND METHOD FOR LIFTING AND TRANSPORTING CONVENTIONAL HAY BALE FEEDERS WITH A ROUND HAY BALE

CROSS-REFERENCE TO RELATED APPLICATIONS

This is a continuation of application Ser. No. 11/328,273, filed Jan. 9, 2006 now U.S. Pat. No. 7,473,066 and claims the benefit of Provisional Patent Application Ser. No. 60/643,102, filed Jan. 11, 2005 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to the maneuvering of a conventional hay bale feeder or ring, typically used to feed cattle, and more specifically to a device and method for (a) lifting and transporting the feeder by an interaction produced between the device and a conventional round hay bale upon the directed movement of the bale and (b) facilitating the placement of the feeder around the bale.

2. Prior Art

In a typical farming or ranching operation, it is a common practice to feed cattle with conventional round bales of hay weighing up to 1800 pounds because they offer many advantages over the alternative of traditional small square bales. Since the round bales shed water, they can be stored outside on the ground with minimal degradation and their large size significantly reduces the bale replenishment frequency when feeding is in progress. The feeding operation necessitates the placement of a conventional hay bale feeder, well established in the prior art, around the bale to help contain the loose hay and prevent cattle from trampling and wasting it. In general, the feeder has a substantially cylindrical structure that is either circular or multi-sided and includes 3 structural closed rings, either round or linearly segmented, respectively, that are concentric about a common vertical axis. The top and middle rings are connected by a series of either vertical or slanted structural members that form a plurality of openings large enough for cattle to pass their heads through. The middle and bottom rings are spaced apart by connecting structural components. Usually, a sheet metal or a heavy wire mesh circular panel covers the space between the middle and bottom rings. Some conventional hay bale feeders with either circular or multi-sided structures have legs attached to the bottom ring to elevate the feeder off of the ground for corrosion protection. The feeders are approximately 4 feet high, 8 feet in diameter and can weigh in excess of 200 pounds. An example of a prior art conventional hay bale feeder that has a circular structure is presented in U.S. Pat. No. 3,851,624 issued Dec. 3, 1974 to Leonard R. Peak. Examples of prior art conventional hay bale feeders that have multi-sided structures were previously manufactured by Priefert Mfg., P.O. Box 1540, 2630 South Jefferson Ave., Mount Pleasant, Tex., 75456-1540 as their model numbers RBF2 and RBFS2.

The size and weight of the round hay bales dictates that their movement and placement be accomplished by a powered vehicle such as a farm tractor, truck, or towed vehicle like a special trailer, each with inherent ability capable of lifting the bale. Numerous vehicular attachments, accessories, mechanisms, implements, and the like have been developed in the past for the sole purpose of lifting and transporting conventional round bales and are well known in the prior art. Most of these bale carriers are attachments that mount to the 3 point hitch on the rear of a farm tractor and usually couple to the bale with either a long spear(s) to pierce the bale near its center axis or a fork with long tines that go under each side of the bale. Other common bale carriers are spear or fork configurations that are mounted to a front end loader on a farm tractor or to the back of a truck. Additionally, special trailers have been developed with spear or fork configurations to transport round bales in the same manner. In the case of a truck or trailer, a powered unit is normally incorporated to provide the required lifting force.

Examples of prior art attachments applicable to tractors are presented in U.S. Pat. Nos. 5,890,864 issued Apr. 6, 1999 to Willie Davis Sloan; 4,364,700 issued Dec. 21, 1982 to John Arabshian and Paul O. Mittelstaedt; 4,318,653 issued Mar. 9, 1982 to William F. Benefield and Elmer D. Larkin; 4,316,691 issued Feb. 23, 1982 to Joseph B. Kucera; 4,275,985, issued Jun. 30, 1981 to Stanley M. Schremmer; 4,120,405 issued Oct. 17, 1978 to John B. Jones and Robert W. Upton; 3,934,726 issued Jan. 27, 1976 to Leon C. Martin; and Des. 245,984 issued Oct. 4, 1977 to William D. Priefert. Tractor 3 point hitch attachments similar to those associated with U.S. Pat. Nos. 4,120,405 and Des. 245,984 are the most common because they require no extra hydraulic components and/or front end loader and are therefore, considerably less expensive. Examples of prior art attachments applicable to trucks are presented in U.S. Pat. Nos. 5,135,343 issued Aug. 4, 1992 to Myron O. Wigness; 4,288,191 issued Sep. 8, 1981 to Bobby R. Lynch; and 4,090,616 issued May 23, 1978 to John G. Runyan and James H. Kline. An example of prior art applicable to a towed vehicle is presented in U.S. Pat. No. 4,348,143 issued Sep. 7, 1982 to Clofford L. Hedgespeth.

In a typical cattle feeding operation, a farm tractor with attached bale carrier is employed to move a hay bale from a storage location, that is not accessible to cattle, to the feeding location, which is normally in close proximity to the feeder that was used in the previous feeding cycle. The bale is placed on the ground and the tractor is moved away from the bale. The tractor operator then gets off the tractor, walks over to the empty feeder, and lifts up on one side of the feeder until it is stable on its circular side. Next, the operator rolls the feeder over to the bale, properly aligns the feeder to the bale, and then pushes the uppermost side of the feeder down over the bale, resulting in it falling to the ground on its lower portion or base. The bale now resides inside the feeder. The operator then removes the twine, that holds the bale together, while intermingling with the cattle trying to get to the bale. After the twine is removed, the cattle are then permitted to access the bale through the plurality of openings in the feeder. The reason that the bale is placed in a different location from the previous feeding location is that if it is not moved, the continued concentration of cattle around the feeder will result in the surrounding grass getting trampled and possibly destroyed and/or ruts being formed in the ground. This condition is compounded when the ground is wet. Another problem is that old uneaten hay will collect in the bottom of the feeder if the feeder is not moved. Also, note that a farm tractor was used in the above description of a feeding operation because it is the most commonly used, but other vehicles with bale carriers, previously described, could be employed.

There are numerous inherent problems associated with feeding cattle in the above described manner, namely due to the required manual maneuvering of the large heavy feeder. First, the tractor operator has to get off of the tractor and walk over to the feeder, leaving cattle that have gathered free to eat from the unprotected bale. Lifting the heavy feeder up on its side can be very hard, especially for small, old, and/or handicapped people. Rolling the 8 foot high feeder can also be a challenging task if the terrain is uneven, uphill, and/or if it is windy. Tilting the feeder over the bale can be the most difficult task for even taller stronger people because the high feeder center of gravity has to be rotated beyond the feeder's ground pivot point by pushing the feeder from only one side which tends to cause an adverse side rotation of the feeder. The problems associated with the manual handling of the feeder are further multiplied if it is raining, muddy, and/or nighttime. In addition, manual handling of the feeder can be deadly to small calves. If calves are near the bale when the feeder falls from its 8 foot height, they could be hit by the feeder and extensively injured or even killed. Removing the hay bale twine in the presence of cattle trying to access the hay bale poses a significant safety problem to the operator.

To help circumvent the problems involved in the manual maneuvering of the feeder, several prior art devices were developed for use on or with farm tractors to lift and carry both round bales and feeders. While these devices provide for powered lifting and carrying of both the bales and feeders, they all heretofore known suffer from a number of deficiencies and drawbacks.

U.S. Pat. No. 6,209,488 issued Apr. 3, 2001 to Leon Wright presents an adapter that attaches to a conventional hay bale feeder which incorporates a receiving cylinder that permits the feeder to be lifted and moved by inserting the spear of a conventional spear bale carrier into the cylinder. The problems associated with this feeder lifting arrangement are: (1) on tractors with limited 3 point hitch lift height, typical of smaller tractors, it is probable that the feeder cannot be lifted high enough to clear large bales due to: the geometry of the 3 point hitch, the close proximity of the feeder to the hitch, and the relatively loose fit between the spear and the receiving cylinder, due to the cylinder having to accommodate different size spears, (2) the adapter can only be used with spear bale carriers, (3) the spear has to be inserted into the adapter's receiving cylinder which can present alignment difficulties and therefore, can be a trying task, (4) the vertical member of the adapter's frame can interfere with the adjacent cattle access openings on some feeders with slanted openings and possibly result in a cow's head being caught in the reduced opening, and (5) in typical feeding practices, using this arrangement requires that the bale be placed at the feeding location and then moving the feeder to the bale, a 2 step process.

U.S. Pat. No. 6,045,314 issued Apr. 4, 2000 to David L. Greene presents a spear bale carrier with a height adjustable hook mechanism on the upper end of the carrier that connects to the top ring on a conventional hay bale feeder to provide feeder lifting when the bale carrier is lifted by a tractor. The carrier also has 2 lower short spears to stabilize the hay bale and a lower pivoting rocker plate to prevent the bottom of the feeder from excessive forward movement. The problems associated with this feeder lifting arrangement are: (1) on tractors with limited 3 point hitch lift height, typical of smaller tractors, it is probable that the feeder cannot be lifted high enough to clear large bales due to the geometry of the 3 point hitch and to the close proximity of the feeder to the hitch, (2) connecting the hook with the top feeder ring could be difficult if the terrain is rough, (3) the lower 2 spears will hit a sheet metal panel connecting the middle ring to the bottom ring on feeders of this type and prevent the hook from connecting to the top feeder ring, unless somehow, the lower 2 spears could be inserted under the feeder's bottom ring (a difficult task) which would require that the adjustable hook be precisely set to the feeder's top ring height, (4) the use of this bale carrier requires the added procurement expense of a redundant bale carrier, since a bale carrier normally already exists in most feeding operations, and (5) in typical feeding practices, using this arrangement requires that the bale be placed at the feeding location and then moving the feeder to the bale, a 2 step process.

U.S. Pat. No. 5,868,098 issued Feb. 9, 1999 to Darrell W. Adams presents a spear bale carrier, with upper hooks that connect to the top ring on a conventional hay bale feeder and a lower curved base to support the bottom of the feeder, which lifts the feeder when the bale carrier is lifted by a tractor. The problems associated with this feeder lifting arrangement are: (1) on tractors with limited 3 point hitch lift height, typical of smaller tractors, it is probable that the feeder cannot be lifted high enough to clear large bales due to the geometry of the 3 point hitch and to the close proximity of the feeder to the hitch, (2) connecting the hooks to the top feeder ring could be difficult or unattainable if the terrain is rough, (3) placing the feeder around a hay bale could be a problem, since the spear could hit or insert into the top of the hay bale before the feeder touches the ground and make hook disengagement difficult, and (4) in typical feeding practices, using this arrangement requires that the bale be placed at the feeding location and then moving the feeder to the bale, a 2 step process.

U.S. Pat. No. 4,330,231 issued May 18, 1982 to James L. Brewer presents an independent feeder adapter that permits a fork bale carrier to interface with or couple to a conventional hay bale feeder, thereby providing a way for lifting and moving the feeder when the bale carrier is lifted by a tractor. This feeder lifting arrangement does not have the limited feeder lifting height deficiency inherent in U.S. Pat. Nos. 6,209,488, 6,045,314, and 5,868,098 because the feeder is lifted at a significant distance from the 3 point hitch resulting in a greater feeder lift height. The problems associated with this feeder lifting arrangement are: (1) the adapter can only be used with fork bale carriers, (2) the adapter has to be wider than the fork bale carrier which dictates that the adapter is wider then at least 2 feeder cattle access openings and therefore, not only will it impede cattle access to the openings but could result in serious injury to cattle by their legs or other body parts being caught in the various openings in the structure, (3) the structure is relatively large and complex resulting in higher relative cost, (4) the feeder cannot be manually turned on its side and rolled with the adapter installed on the feeder, and (5) in typical feeding practices, using this arrangement requires that the bale be placed at the feeding location and then moving the feeder to the bale, a 2 step process.

U.S. Pat. No. 4,302,139 issued Nov. 24, 1981 to Elton K. Malish presents a 3 point hitch spear bale carrier that has a relatively long boom with hooks that connect to the top ring of a conventional hay bale feeder and a hydraulic actuator that provides for articulation of both the bale and feeder. As with U.S. Pat. No. 4,330,231, the bale carrier does not have the limited feeder lifting height deficiency for the same reasons. In addition, an even greater lift height is achieved by the articulation provided by the hydraulic actuator. The problems associated with this feeder lifting arrangement are: (1) the significantly higher relative cost due to the carrier's heavy boom structure and hydraulic components, (2) the carrier cannot be used on smaller tractors due to the high torque, created by the weight of the bale and the long boom, which can cause the front of the tractor to lift off of the ground, and (3) in typical feeding practices, using this arrangement requires that the bale be placed at the feeding location and then moving the feeder to the bale, a 2 step process.

SUMMARY

In accordance with the present invention, a device for adapting a conventional hay bale feeder for lift and transport in association with the directed movement of a conventional round hay bale comprises (a) a lift arm, connected to the feeder, having an upper end and a lower end, that is disposed on the outside of the feeder such that the lower end is adjacent to a bottom edge of the feeder and the upper end extends toward a top edge of the feeder in a spaced relationship thereto in such a manner that the lift arm forms an acute angle with the outside of the feeder; (b) a lift arm support or brace structure that is connected the lift arm and to the feeder; and (c) an anti-slide stabilizing member that is connected to the feeder and positioned adjacent to the bottom edge of the feeder. In addition, the present invention further includes a method of lifting and transporting the hay bale feeder in association with the directed movement of the round hay bale and positioning the hay bale feeder around the hay bale.

Accordingly, the present invention may have one or more of the following advantages which are:

(a) to provide a device and method for lifting and transporting a conventional hay bale feeder by the directed movement of a conventional round hay bale;

(b) to provide a device and method that facilitates the manual or powered placement of the feeder around the hay bale;

(c) to provide a device that establishes the possibility of not having to remove hay bale twine, which holds the hay bale together, in the presence of cattle which enhances worker safety;

(d) to provide a device that can be used with both a spear and a fork bale carrier;

(e) to provide a device that can be used with a bale carrier on a tractor, truck, or special trailer;

(f) to provide a device that will permit traditional manual feeder movement by lifting and rolling;

(g) to provide a device that will not interfere with cattle entering the feeder access openings;

(h) to provide a device that will be safer for cattle and not have openings whereby cattle could get caught and hurt;

(i) to provide a device that permits a slower downward descent of the feeder over the bale, thereby promoting the safety of small calves;

(j) to provide a device that can be easily retrofitted in the field to existing feeders of varying heights;

(k) to provide a device that can be integrated into a feeder at manufacture resulting in a complete stand alone unit;

(l) to provide a device that is not a function of bale carrier lifting height; and (m) to provide a device and method that will permit the bale to be moved directly to the feeder and then both the bale and feeder transported to the new feeding location as a unit, a one step process.

Further advantages of the present invention are to provide a device that: will produce conventional hay bale feeder lift and transport by the directed movement of either a conventional round or square bale; will produce feeder lift and transport which is not a function of the interacting bale's orientation on the bale carrier; is simple and inexpensive; and may elevate the associated feeder off the ground for protection from corrosion. Still further advantages may become apparent from a consideration of the ensuing description and the drawings.

BRIEF DESCRIPTION OF THE DRAWING FIGURES

A better understanding of the present invention may be had by reference to the drawing figures wherein.

Figure 18:
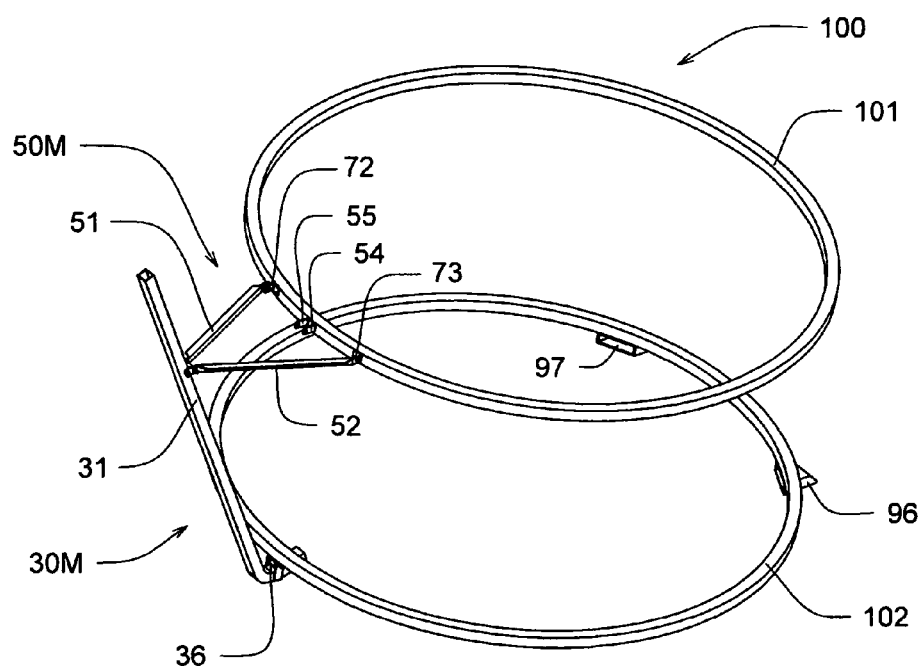

FIG. 18 is a perspective view of the first alternate embodiment showing a more discernible illustration of the incorporation of the modified version of the lift arm assembly, the modified version of the lift arm support assembly, the left anti-slide stabilizing member, and the right anti-slide stabilizing member to the respective top and bottom rings of the feeder with unrelated feeder components removed for clarity.

Figure 19:
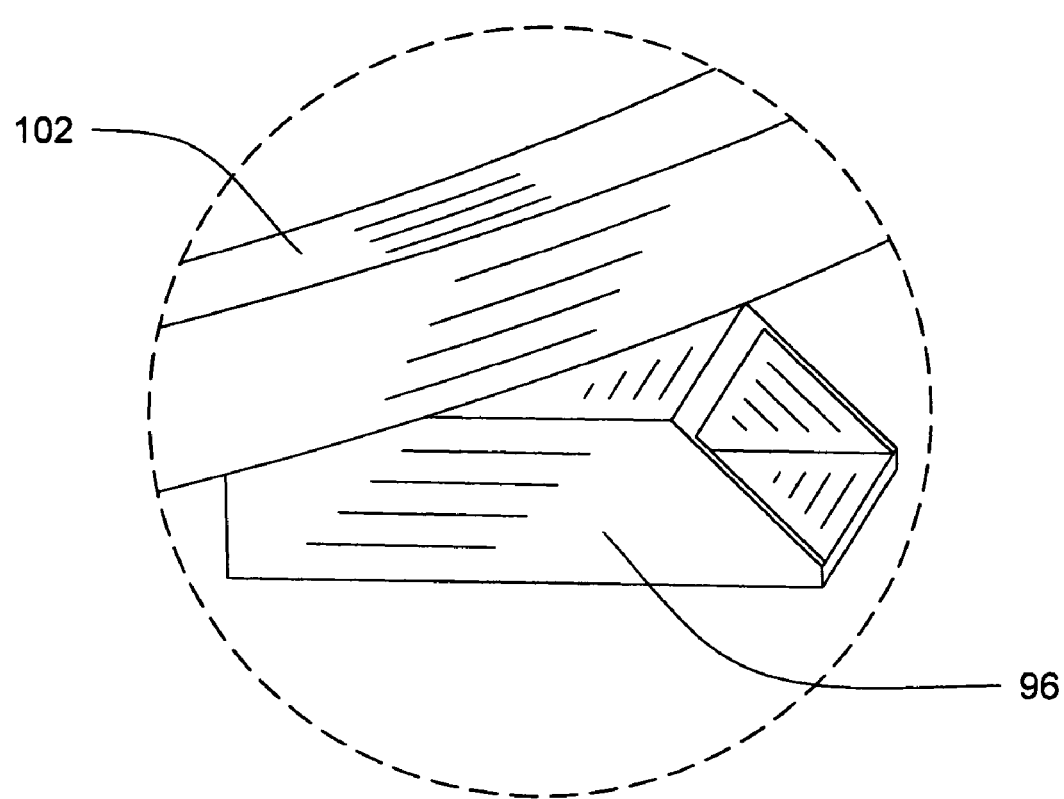

FIG. 19 is an enlarged perspective view showing the right anti-slide stabilizing member affixed to the bottom ring of the feeder with unrelated feeder components removed for clarity.

Figure 20:
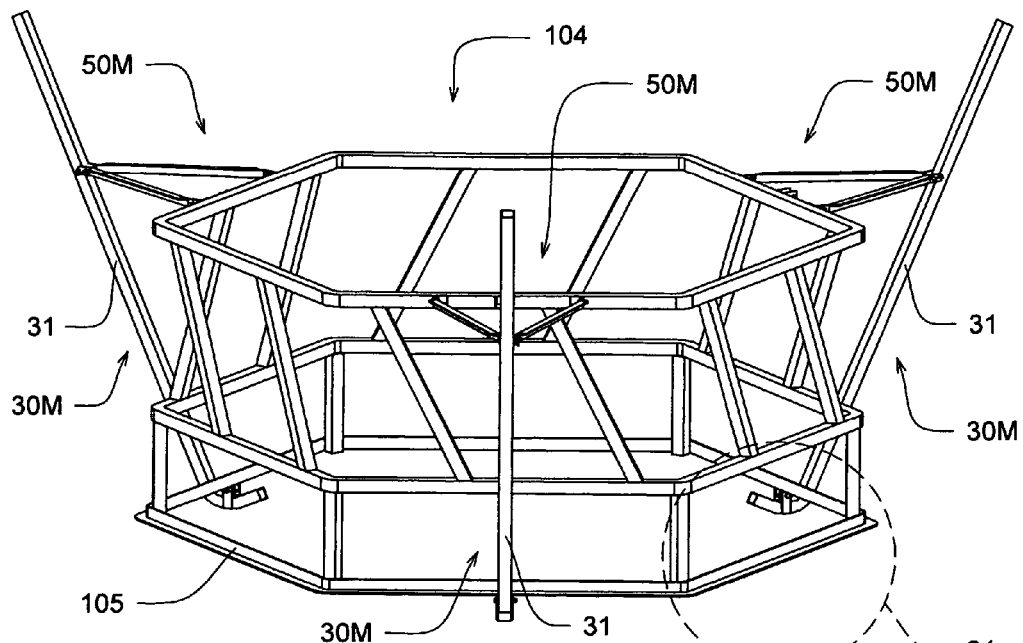

FIG. 20 is a side perspective view showing a second alternate embodiment of the present invention which permanently integrates a plurality of the modified versions of the lift arm assembly and a plurality of the modified versions of the lift arm support assembly to a conventional hay bale feeder, having a multi-sided structure, to form a complete stand alone unit.

Figure 21:
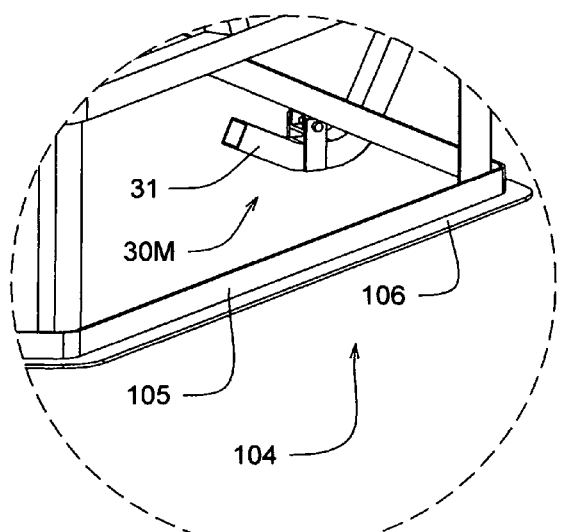

FIG. 21 is an enlarged perspective view showing the angled configuration and orientation of the bottom ring of the feeder in FIG. 20.

DESCRIPTION OF THE EMBODIMENTS

Description

Preferred Embodiment—FIG. 1 Through FIG. 16

Figure 1:
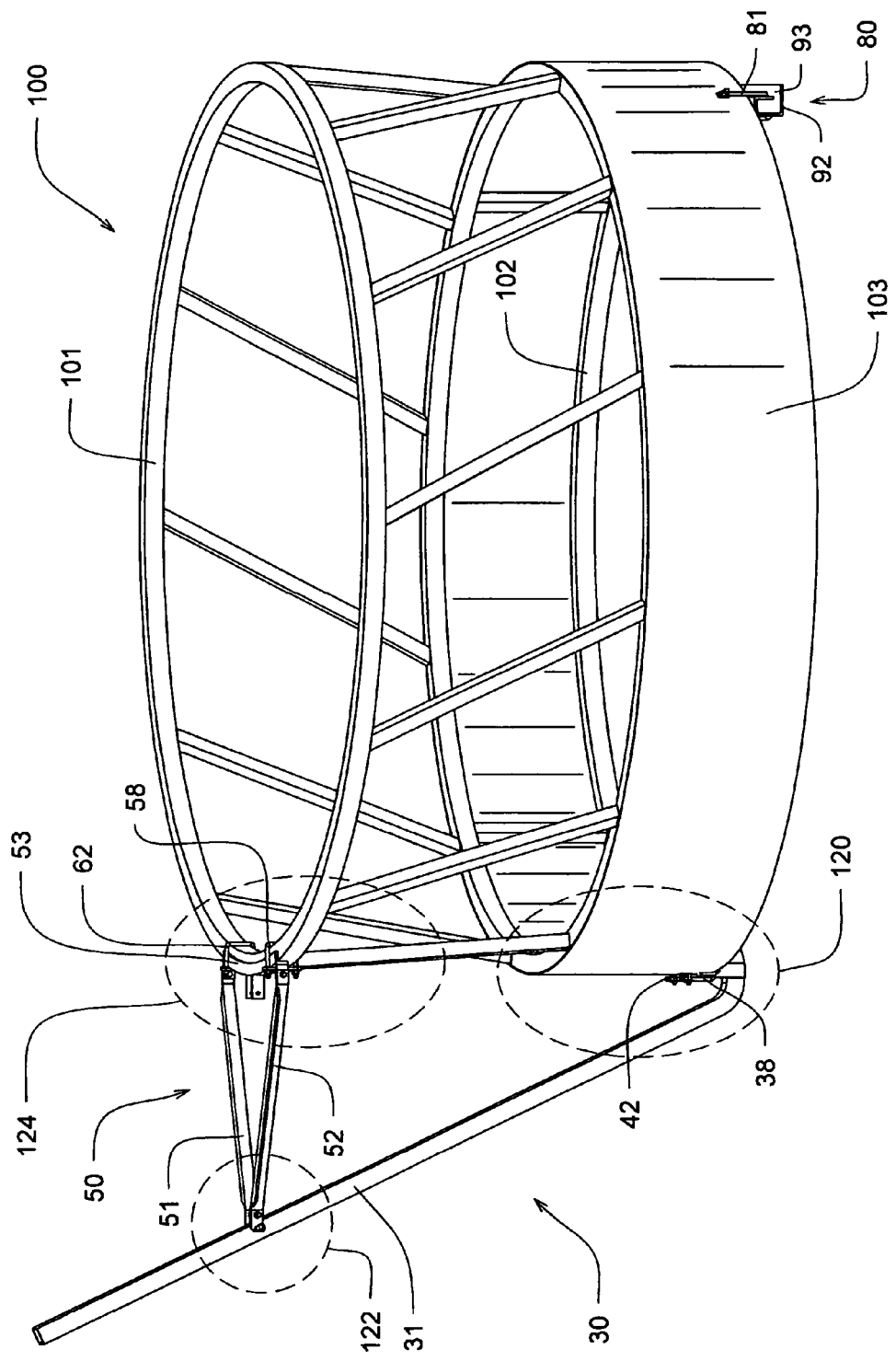
FIG. 1 is a side perspective view showing the present invention coupled to a conventional hay bale feeder having a circular structure.
Figure 2:
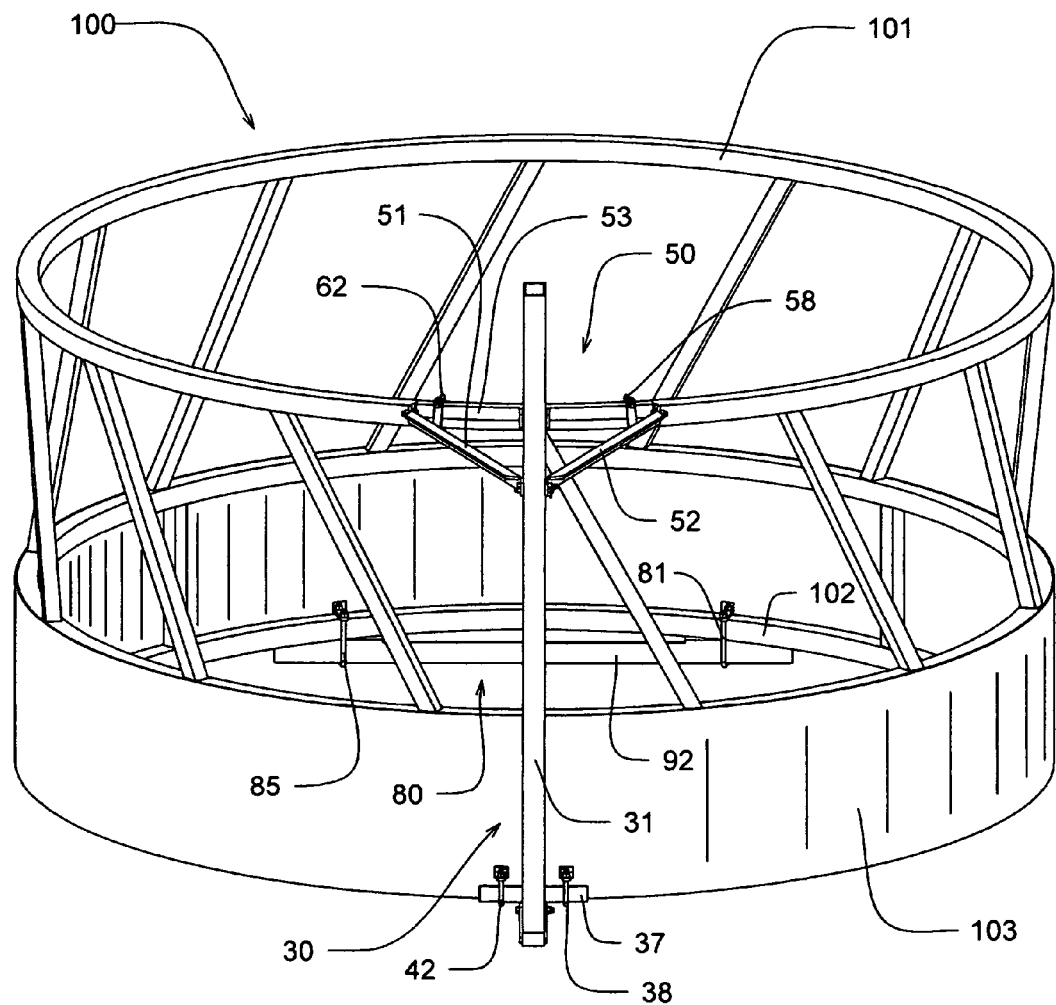
FIG. 2 is a front perspective view showing the present invention coupled to the feeder.

FIG. 1 and FIG. 2 show perspective views of the side and front, respectively, of a preferred embodiment of the present invention coupled to a conventional hay bale feeder 100 that has a circular structure. The device or adapter assembly for lifting and transporting conventional hay bale feeders, according to the present invention, consists of 3 assemblies, namely a lift arm or tilt ramp assembly 30, a lift arm or tilt ramp support assembly 50, and an anti-slide stabilizing assembly 80, each of which is coupled to the feeder 100 at the general locations shown. FIG. 1 and FIG. 2 show the major components of each of these 3 assemblies and the corresponding components of the feeder 100. The components of the feeder 100 that relate to the device are a top ring 101, a bottom ring 102, and a circular panel 103. The lift arm assembly 30 includes a lift arm, tilt ramp, or tilt bar 31, a lower coupling bracket 37, a U-bolt 38, and a U-bolt 42. The lift arm 31 is pivotably attached to the lower coupling bracket 37 which is in turn removably attached to the bottom ring 102 of the feeder 100 using the U-bolt 38 and the U-bolt 42. The lift arm assembly 30 can be attached to the feeder 100 at a first point located anywhere within area 120 using suitable coupling components. The lift arm assembly 30 is further described and detailed in FIG. 3 and FIG. 4. The lift arm support assembly 50 includes a left brace 51, a right brace 52, an upper coupling bracket 53 with a left forward facing flange 72 and a right forward facing flange 73 (see FIG. 5 and FIG. 6), a U-bolt 62, and a U-bolt 58. The left brace 51 and the right brace 52 are attached to the upper end of the lift arm 31 at one end and to the left forward facing flange 72, and the right forward facing flange 73 of the upper coupling bracket 53, respectively, at the other end. The upper coupling bracket 53 is removably attached to the top ring 101 of the feeder 100 at the general position shown using the U-bolt 58 and the U-bolt 62. The lift arm support assembly 50 can be attached to the feeder 100 at a third point located anywhere within area 124 using suitable coupling components. The lift arm support assembly 50 is further described and detailed in FIG. 5 and FIG. 6. The anti-slide stabilizing assembly 80 includes a ground contacting member, a lateral anti-slide stabilizing member or stabilizer 92, which incorporates a lateral ground engaging member or a lateral ground engaging anti-slide flange 93, a left U-bolt 85, and a right U-bolt 81. The anti-slide stabilizing member 92 is removably attached to the lower side of the bottom ring 102 of the feeder 100 at a position on the opposite side of the feeder 100 to the lift arm assembly 30, using the left U-bolt 85 and the right U-bolt 81. The anti-slide stabilizing assembly 80 is further described and detailed in FIG. 7 and FIG. 8. The lower portion of the feeder 100 is covered with the circular panel 103 that is shown as being from a solid sheet but could be made from heavy wire mesh sheet or other suitable material. The circular panel 103 helps to contain loose hay within the feeder 100.

Figure 4:
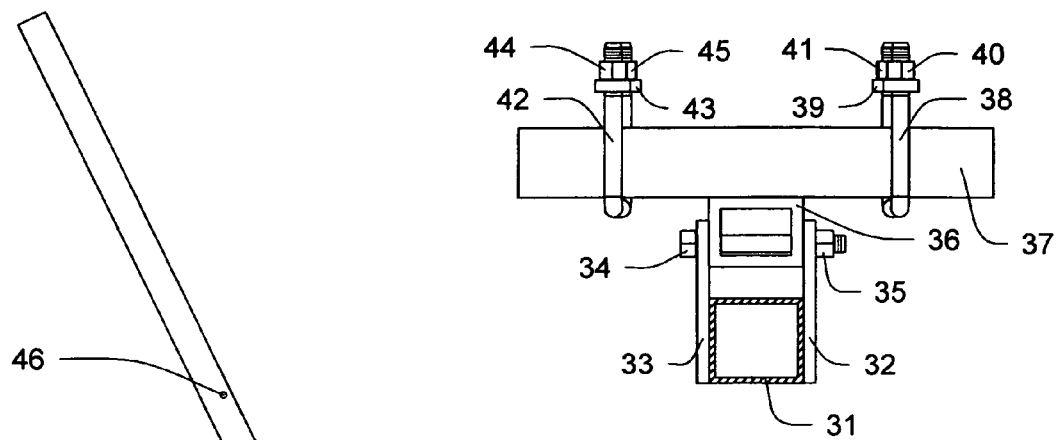
FIG. 4 is an elevation view showing a section of the lift arm assembly, looking aft.
Figure 3:
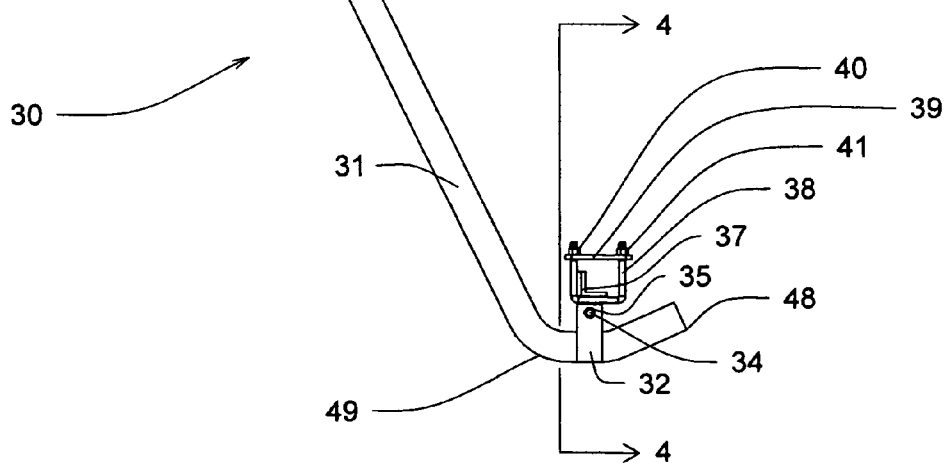
FIG. 3 is a side elevation view showing a lift arm assembly of the present invention.

FIG. 3 and FIG. 4 are elevation views that show the side and a section, looking aft, respectively, of the lift arm assembly 30. The lift arm assembly 30 consists of the lift arm 31, the lower coupling bracket 37, the U-bolt 38, and the U-bolt 42, previously mentioned, and a left hinge plate 33, a right hinge plate 32, an upper hinge bracket 36, a hinge bolt 34, a hinge bolt locknut 35, a U-bolt plate 39, a U-bolt plate 43, a U-bolt nut 40, a U-bolt nut 41, a U-bolt nut 44 and a U-bolt nut 45. The lift arm 31 has a straight upper portion or end and lower portion or end having an arcuate section or a hay bale engagement prong 49. The lift arm 31 also has a hole 46 through its upper end that provides for attachment of the left brace 51 and the right brace 52 and further includes a blunt aft end 48. The hole 46 can be located at a second point anywhere within area 122. The left hinge plate 33 and the right hinge plate 32 both have a hole in their upper portions and their lower portions are welded to the left side of the lift arm 31 and right side of the lift arm 31, respectively, at the positions shown. The upper hinge bracket 36 has a hole in the lower portion of each of its vertical walls and is welded to the bottom of the lower coupling bracket 37 at the position shown. When assembled, the upper hinge bracket 36 is located between the left hinge plate 33 and the right hinge plate 32. The hinge bolt 34 passes through the respective holes in the upper hinge bracket 36, the left hinge plate 33 and the right hinge plate 32 which permits the lift arm 31 to pivot about the lower coupling bracket 37. The hinge bolt locknut 35 secures the hinge bolt 34 in place. The U-bolt 38 in combination with the U-bolt plate 39, the U-bolt nut 40, and the U-bolt nut 41 and the U-bolt 42 in combination with the U-bolt plate 43, the U-bolt nut 44 and the U-bolt nut 45 attach the lower coupling bracket 37 to the bottom and forward sides of the bottom ring 102. If the circular panel 103 shown in FIG. 1 and FIG. 2 is made of a solid sheet, then corresponding holes have to be cut in the circular panel 103 to allow the passage of the U-bolt plate 39 and the U-bolt plate 43.

Figure 5:
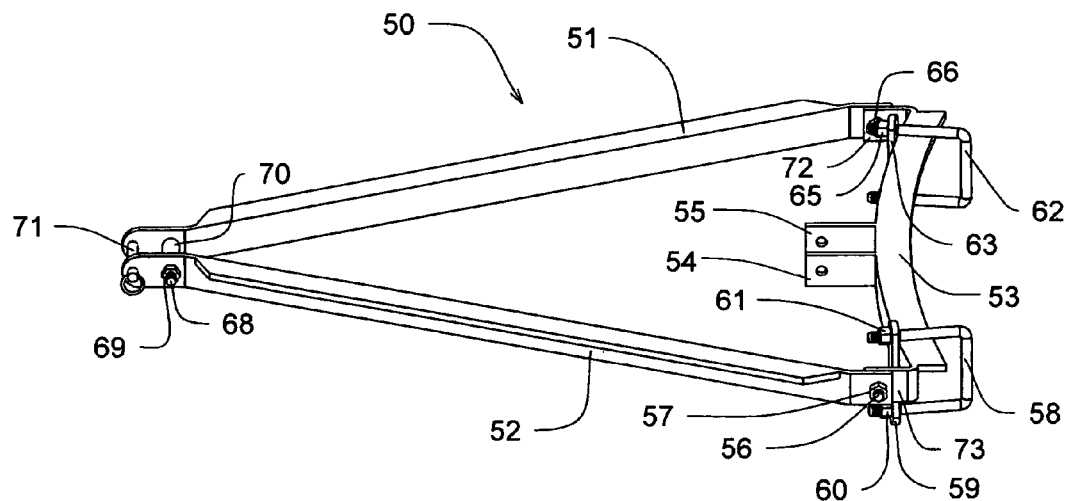
FIG. 5 is a side perspective view showing a lift arm support assembly of the present invention.
Figure 6:
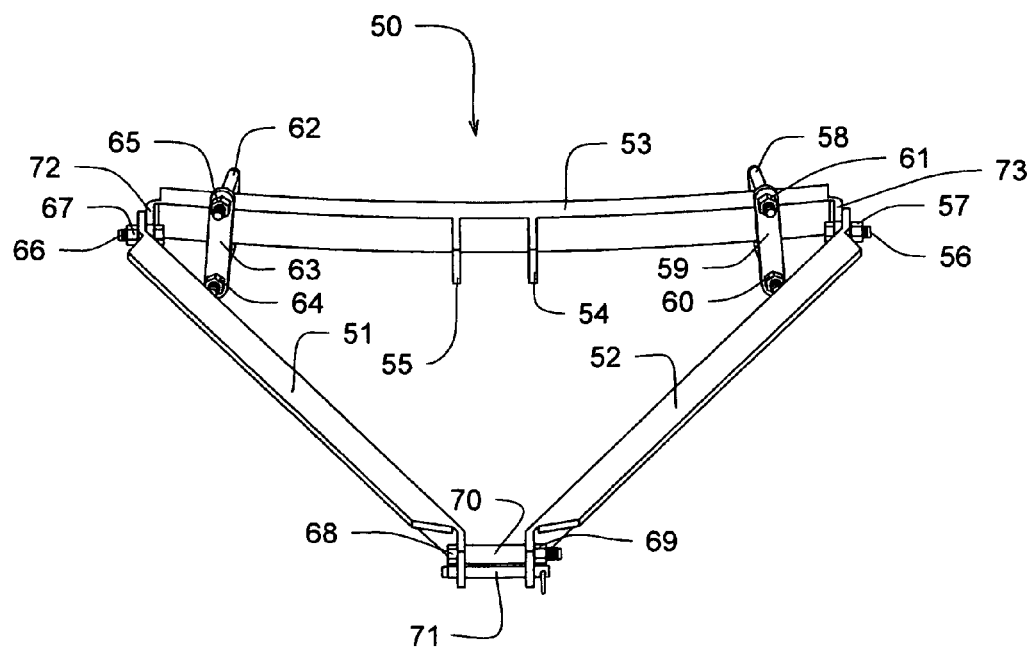
FIG. 6 is a front perspective view of the lift arm support assembly.

FIG. 5 and FIG. 6 are perspective views that show the side and front of the lift arm support assembly 50, respectively. The lift arm support assembly consists of the left brace 51, the right brace 52, the upper coupling bracket 53, the left forward facing flange 72, the right forward facing flange 73, the U-bolt 62, and the U-bolt 58, previously mentioned, and a left forward facing lug 55, a right forward facing lug 54, a left bolt 66, a left bolt locknut 67, a right bolt 56, a right bolt locknut 57, a spacer 70, a spacer bolt 68, a spacer nut 69, a quick release pin 71, a U-bolt plate 63, a U-bolt nut 64, a U-bolt nut 65, a U-bolt plate 59, a U-bolt nut 61, and a U-bolt nut 60. The left brace 51 and the right brace 52 have 2 holes in each of their forward ends and 1 hole in each of their aft ends. The left forward facing flange 72 and the right forward facing flange 73 of the upper coupling bracket 53 each have holes. The left bolt 66 passes through both the hole in the aft end of the left brace 51 and the hole in the left forward facing flange 72, connecting the left brace 51 to the left side of the upper coupling bracket 53. The left bolt locknut 67 secures the left bolt 66 in place. In a like manner, the right bolt 56 passes through both the hole in the aft end of the right brace 52 and the hole in the right forward facing flange 73, connecting the right brace 52 to the right side of the upper coupling bracket 53. The right bolt locknut 57 secures the right bolt 56 in place. The spacer bolt 68 passes through the aft hole on the forward end of the left brace 51, through an internal hole in the spacer 70, and through the aft hole on the forward end of the right brace 52 with the spacer nut 69 securing the spacer bolt 68 in place. The left bolt locknut 67 and the right bolt locknut 57 are loosely tightened so that the left brace 51 and the right brace 52 can pivot about the left forward facing flange 72 and the right forward facing flange 73, respectively. With the connection provided by the spacer bolt 68 and the spacer nut 69 along with the loose tightening of the left bolt locknut 67 and the right bolt locknut 57, the left brace 51 and the right brace 52 can be pivoted as a unit about the upper coupling bracket 53. With the lift arm 31 positioned between the forward ends of the left brace 51 and the right brace 52 (see FIG. 2), the quick release pin 71 is passed through the forward hole in the forward end of the right brace 52, the hole 46 in the lift arm 31, and the forward hole in the forward end of the left brace 51. With the quick release pin 71 in place, the upper end of the lift arm 31 is secured to the forward end of the lift arm support assembly 50. The left side of the upper coupling bracket 53 is attached to the top ring 101 with the U-bolt 62, the U-bolt plate 63, the U-bolt nut 64, and the U-bolt nut 65. The right side of the upper coupling bracket 53 is attached to the top ring 101 with the U-bolt 58, the U-bolt plate 59, the U-bolt nut 60, and the U-bolt nut 61.

The left forward facing lug 55 and the right forward facing lug 54, shown on FIG. 5 and FIG. 6, are welded to the upper coupling bracket 53, at the positions shown. Both the left forward facing lug 55 and the right forward facing lug 54 have holes in their forward portions that are aligned with each other. The purpose of the left forward facing lug 55 and the right forward facing lug 54 is to provide for securing the upper end of the lift arm 31 to the upper coupling bracket 53, which in turn, secures the lift arm 31 to the feeder 100 at a fourth point located anywhere within area 126.

Figure 7:
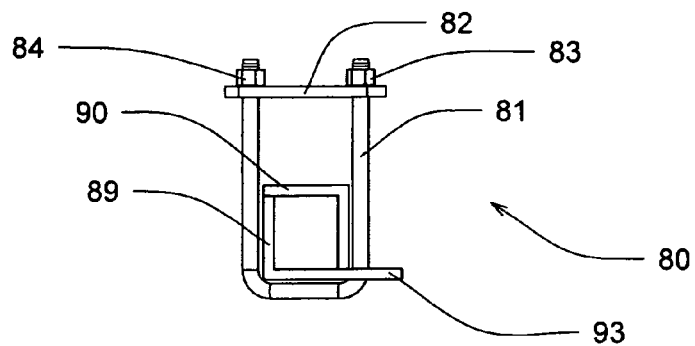
FIG. 7 is a side elevation view showing an anti-slide stabilizing assembly of the present invention.
Figure 8:
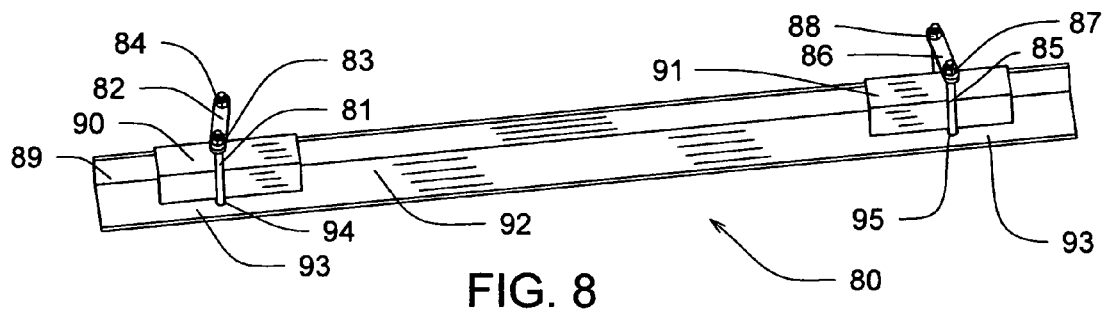
FIG. 8 is a rear perspective view of the anti-slide stabilizing assembly.

FIG. 7 and FIG. 8 are an elevation view showing the right side of the anti-slide stabilizing assembly 80 and a perspective view showing the rear of the anti-slide stabilizing assembly 80, respectively. The anti-slide stabilizing assembly 80 consists of the anti-slide stabilizing member 92 which includes the anti-slide flange 93, the left U-bolt 85 and the right U-bolt 81, previously described, and a U-bolt plate 82, a U-bolt nut 83, a U-bolt nut 84, a U-bolt plate 86, a U-bolt nut 87, and a U-bolt nut 88. The anti-slide stabilizing member 92 is fabricated by welding a right inverted angle 90 and a left inverted angle 91 to an angle 89 at the positions shown in FIG. 8. The anti-slide flange 93 is formed by the extension of the horizontal leg of the angle 89 beyond the left and the right inverted angles 91 and 90, respectively. The horizontal legs of the left inverted angle 91 and the right inverted angle 90 form a flat platform for mounting the anti-slide stabilizing member 92. A hole 95 and a hole 94 are drilled into the anti-slide flange 93 to permit the passage of the U-bolts 85 and 81, respectively, through the anti-slide flange 93. The anti-slide stabilizing member 92 is attached to the lower side of the bottom ring 102 on the right side with the U-bolt 81, the U-bolt plate 82, the U-bolt nut 83, and the U-bolt nut 84 and on the left side with the U-bolt 85, the U-bolt plate 86, the U-bolt nut 87, and the U-bolt nut 88. If the circular panel 103 shown in FIG. 1 and FIG. 2 is made of a solid sheet, then corresponding holes have to be cut in the circular panel 103 to allow the passage of the U-bolt plate 82 and the U-bolt plate 86.

Figure 9:
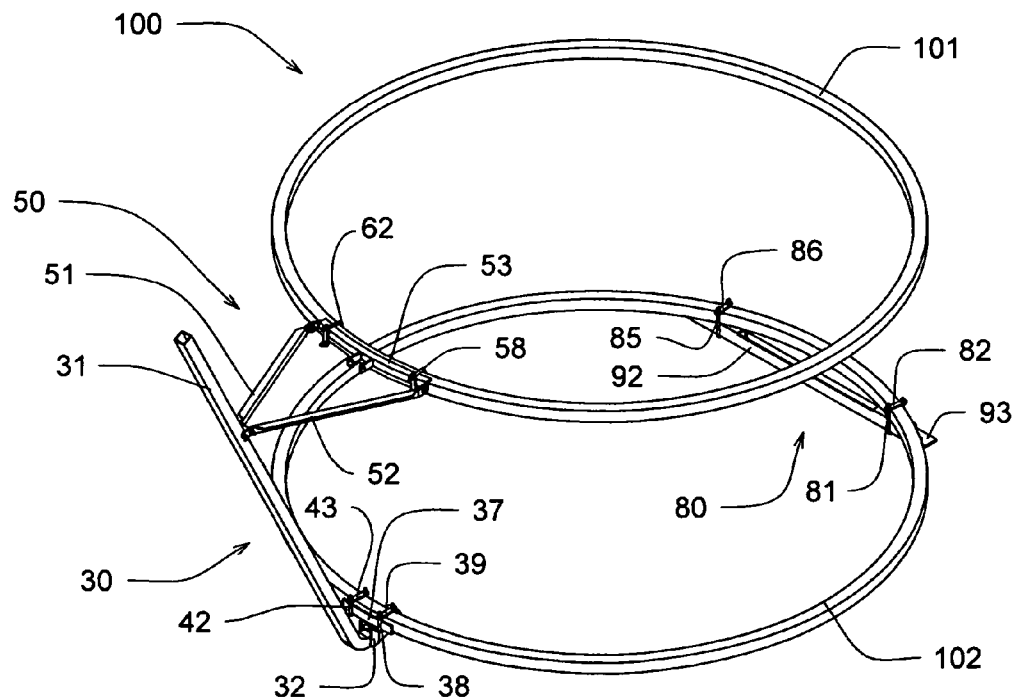
FIG. 9 is a perspective view showing a more discernible illustration of the attachment of the present invention to a top ring and a bottom ring of the feeder, with unrelated feeder components removed for clarity.

FIG. 9 is a perspective view showing a more discernible illustration of the attachment of the lift arm assembly 30 and the anti-slide stabilizing assembly 80 to the bottom ring 102 of the feeder 100 and the attachment of the lift arm support assembly 50 to the top ring 101 of the feeder 100. In this view, all the components of the feeder 100 have been removed for clarity except for the top ring 101 and the bottom ring 102. This illustration clearly shows the overall attachment configuration and orientation of the lift arm assembly 30, the lift arm support assembly 50, and the anti-slide stabilizing assembly 80 to the feeder 100.

Operation

Preferred Embodiment—FIG. 1, FIG. 3, FIG. 6, FIG. 10, FIG. 11, FIG. 12, FIG. 13, FIG. 14, FIG. 15, and FIG. 16

Before describing the actual operation of the preferred embodiment, the major function of each of the preferred embodiment's three main assemblies will be briefly mentioned. The lift arm assembly 30 provides for lifting and transporting of the feeder 100 by interacting with a moving conventional round hay bale. The lift arm support assembly 50 provides structural support to the upper end of the lift arm 31 and maintains the lift arm 31 at the optimum lifting angle, with respect to the feeder 100. The anti-slide stabilizing assembly 80 provides for unidirectional sliding and side to side rocking stability, with respect to the ground 113, of the feeder 100 when the feeder 100 is lifted and transported by the lift arm 31.

Figure 10:
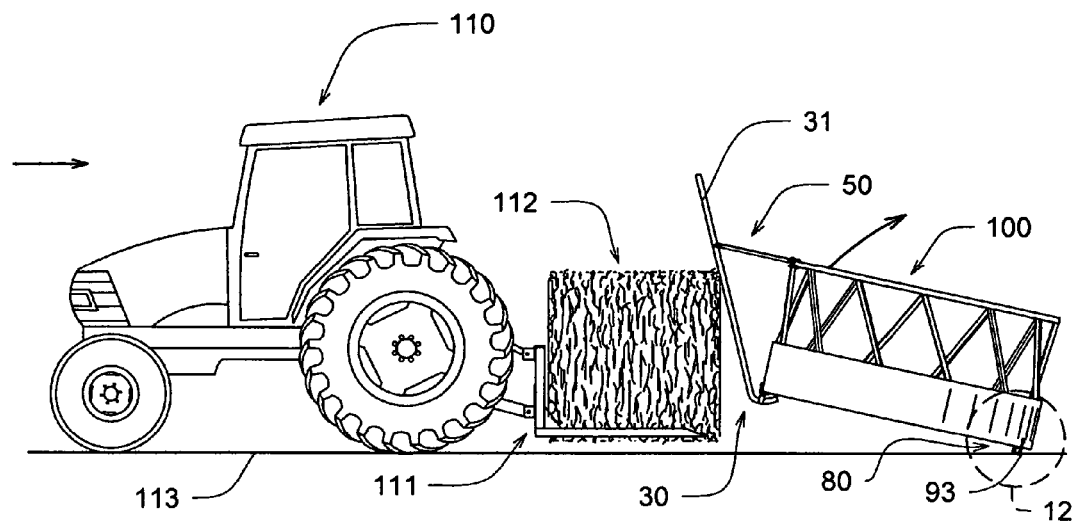
FIG. 10 is a side elevation diagrammatic view illustrating the present invention lifting the feeder by the interaction of the present invention with a conventional round hay bale being moved in a direction toward the feeder.
Figure 11:
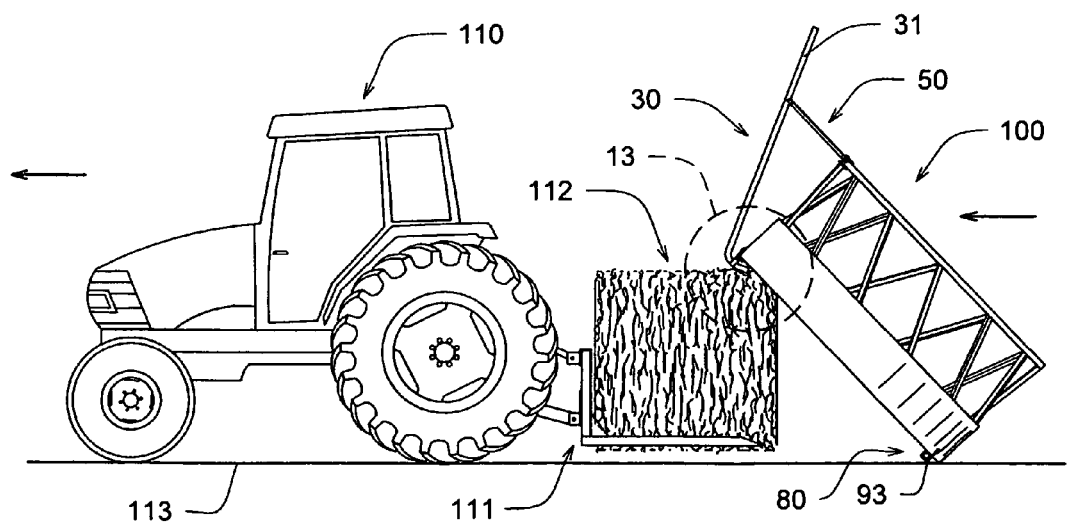
FIG. 11 is a side elevation diagrammatic view illustrating the feeder being transported by the interaction of the present invention with the conventional round hay bale being moved in a direction away from the feeder.
Figure 12:
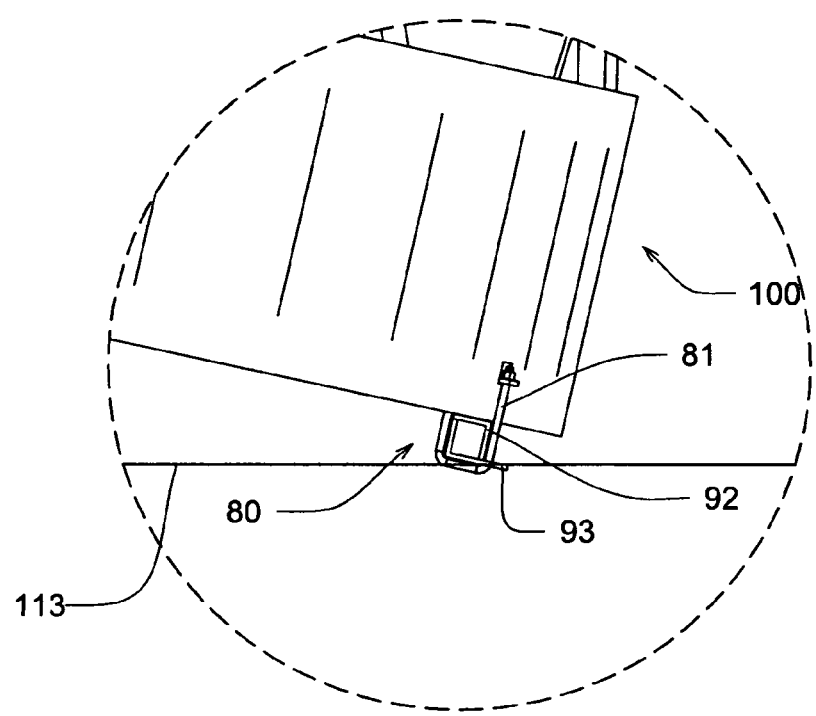
FIG. 12 is an enlarged side elevation diagrammatic view illustrating the ground engagement of an anti-slide flange of the anti-slide stabilizing assembly upon lifting of the feeder.

Initially, the feeder 100 with the lift arm assembly 30, the lift arm support assembly 50, and the anti-slide stabilizing assembly 80 installed is resting on the ground 113. The feeder 100 itself is not actually resting on the ground 113 but is raised off the ground 113 by the lower end of the lift arm 31 and the anti-slide stabilizing assembly 80. With reference to FIG. 10, a farm tractor 110 with a fork bale carrier 111 attached to its 3 point hitch is used to transport a conventional round hay bale 112 directly to the site of the feeder 100. Usually, the hay bale 112 is needed to replenish the feeder 100 from the previous feeding, as is the case in this explanation of operation. The tractor 110 with the loaded hay bale 112 is backed in a rearward of reverse direction toward the lift arm 31, while maintaining only general alignment between the center of the hay bale 112 and the lift arm 31. Since the vertical height of the lift arm 31 is higher than the hay bale 112, the operator of the tractor 110 can easily see the upper end of the lift arm 31 while backing. When the rear of the hay bale 112 contacts the upper end of the lift arm 31, an interaction occurs between the lift arm 31 and the hay bale 112 imparting a force to the lift arm 31 at the hay bale 112 contact point. The force has a component force in the vertical direction which causes the lift arm 31 to move upward, which in turn, results in the feeder 100 being tilted in an upward direction about the anti-slide stabilizing assembly 80, as shown in FIG. 10. The force also has a component force in the horizontal direction which could cause the feeder 100 and the anti-slide stabilizing assembly 80 to slide in a rearward direction but this movement is prevented by the anti-slide flange 93 penetrating into the ground 113 due to its downward orientation, as shown in FIG. 12. Note that the anti-slide flange 93 extends outwardly on both sides of the feeder 100 to provide laterally balanced ground engagement, as shown in FIG. 9. Also, since the forward side of the lift arm 31 has a smooth continuous surface over its entire length, the lift arm 31 will easily slide up the hay bale 112, resulting in only a minimal component force in the horizontal direction. As the tractor 110 is backed further, the lift arm 31 continues to slide up the rear corner of the hay bale 112 until the arcuate section 49 of the lift arm 31 is resting on the top rear portion of the hay bale 112, as shown in FIG. 11. At this point, the rearward motion of the tractor 110 is terminated. With the arcuate section 49 of the lift arm 31 resting on the top rear portion of the hay bale 112, the forward bottom portion of the feeder 100 is now above the rear top portion of the hay bale 112.

Figure 13:
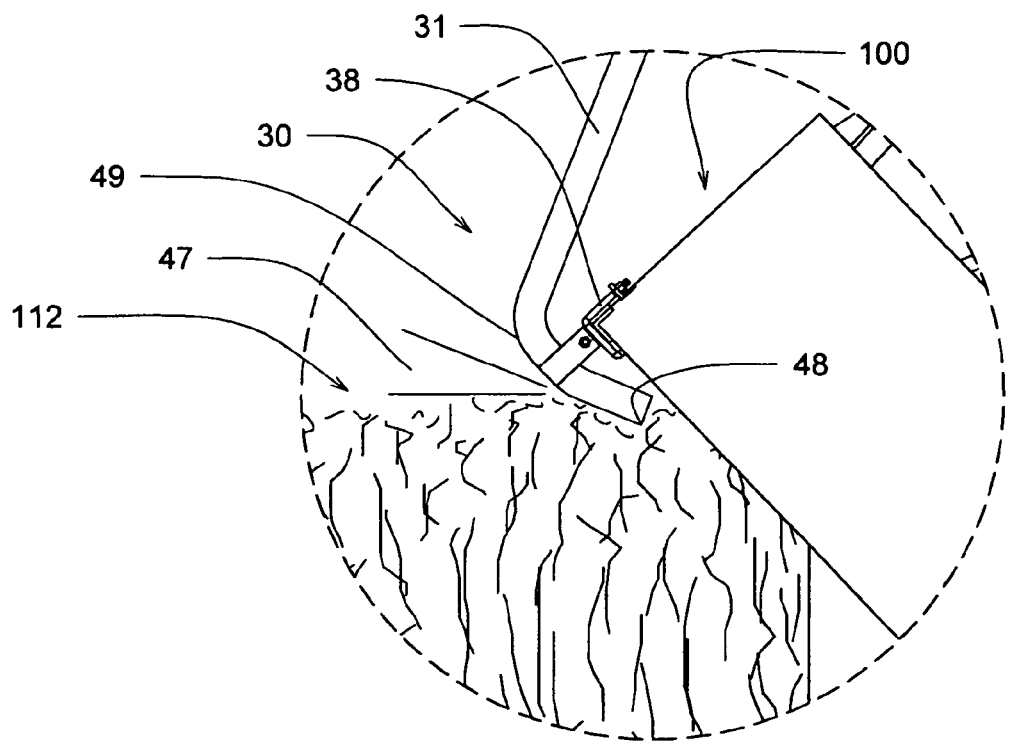
FIG. 13 is an enlarged side elevation diagrammatic view illustrating an engagement or penetration of a lower end of a lift arm of the lift arm assembly into the conventional round hay bale.

When the tractor 110 is moved forward, the blunt lower aft end 48 of the lift arm 31 penetrates or engages into the hay bale 112, see FIG. 13, causing the feeder 100 to also be moved in the forward direction. With the arcuate section 49 of the lift arm 31 positioned on top of the hay bale 112, a negative or downward angle 47 is created with respect to the lower aft most portion of the arcuate section 49 and the horizontal, as shown in FIG. 13. The downward angle 47 causes the weight of the lifted portion of the feeder 100, the lift arm assembly, and the lift arm support assembly to be concentrated at the aft end 48 of the lift arm 31 which in turn, increases the penetration of the aft end 48 into the hay bale 112 upon its forward motion. Since the anti-slide flange 93 is angled downward in the aft direction, forward motion of the feeder 100 and the anti-slide stabilizing assembly 80 is not impeded by the action of the anti-slide flange 93. With the forward side of the feeder 100 above the hay bale 112, the anti-slide stabilizing assembly 80 contacts the ground 113 on both sides of the feeder 100 thereby limiting side to side rocking movement of the feeder 100 during transport. The tractor 110 continues to move in a forward direction to transport the feeder 100 to its final feeding destination. At this final feeding location, the hay bale 112 is lowered to the ground 113 and the tractor 110 with the fork bale carrier 111 attached is moved away from the hay bale 112. The operator then gets off the tractor 110 and removes the hay bale twine while the feeder 100 is still resting on top of the hay bale 112. The reason for removing the twine at this point, is that the feeder 100 acts as a wall to help protect the operator from the cattle. After cutting the twine, the operator walks to the rear of the feeder 100. The operator then easily pushes the feeder 100 forward along the top of the hay bale 112 until the aft end 48 of the lift arm 31 moves off the front top corner of the hay bale 112 at which time the feeder 100 slowly falls to the ground 113. Since the arcuate section 49 of the lift arm 31 is curved on its forward side, the feeder 100 is easily pushed along the top of the hay bale 112. The feeder 100 slowly falls to the ground 113 due to the way in which the arcuate section of the lift arm 31 and the feeder 100 interact with the round forward portion of the hay bale 112. Depending on the type of hay and the tightness of the hay bale 112, it is possible that the twine can be removed before moving the hay bale 112 into the feeding area since the bale is constantly moving and therefore, never left alone for cattle to tear up. This in turn enhances operator safety because the operator does not have to intermingle with the cattle while removing the twine. As an alternative to manually pushing the feeder 100 along the top of the hay bale 112, the tractor 110 can be backed toward the rear of the feeder 100 and use the bale carrier 111 to push the feeder 100 forward until it falls down around the hay bale 112. Furthermore, if the tractor 110 has a front end loader installed with a front end loader type fork bale carrier or spear bale carrier attached, the loader can be used to lift and transport the hay bale 112 and the feeder 100 in the above described manner, and then the hay bale 112 pushed in the reverse direction directly into the feeder 100 until the feeder 100 falls down to the ground 113 around the hay bale 112. In addition, if the tractor 110 is used to position the hay bale 112 inside the feeder 100, by either pushing the hay bale 112 into the feeder 100 or pushing the feeder 100 down around the hay bale 112, and if the hay bale twine has been previously removed, the tractor 110 operator can accomplish the complete feeder 100 replenishment operation without getting off of the tractor 110. Moreover, while the above description of operation was related to the hay bale 112, the operation would be the same if a large square hay bale had been used, as the interaction of the lift arm 31 would be the same for most any hay bale geometry.

With the hay bale 112 inside the feeder 100, cattle can easily enter the access openings of the feeder 100 without interference from either the lift arm assembly 30 or the lift arm support assembly 50. The lift arm assembly 30 does not interfere because the lift arm 31 is angled away from the feeder 100 and is at a significant distance from the access openings of the feeder 100. The lift arm support assembly 50 does not interfere because it is located above the access openings of the feeder 100. For reference, see FIG. 1.

Figure 14:
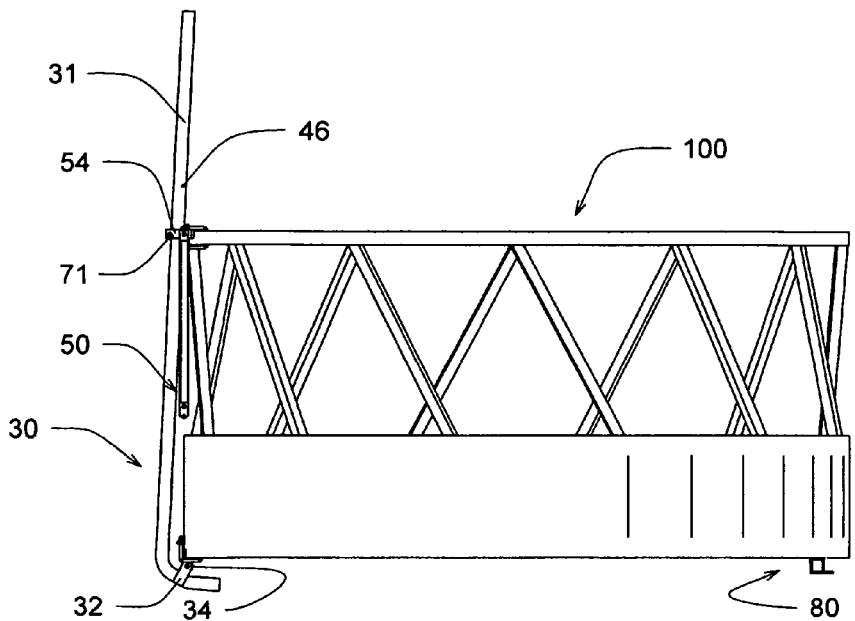
FIG. 14 is a side elevation view showing the present invention reconfigured for manual rolling of the feeder.
Figure 15:
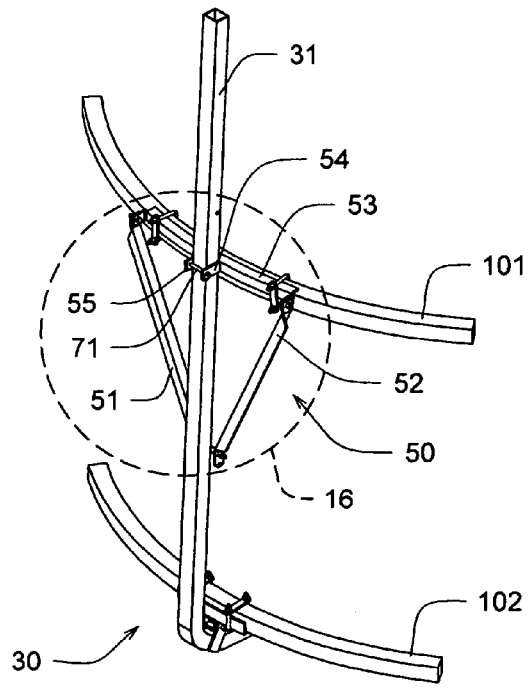
FIG. 15 is a perspective view showing the present invention reconfigured for manual rolling of the feeder, with unrelated feeder components removed for clarity.
Figure 16:
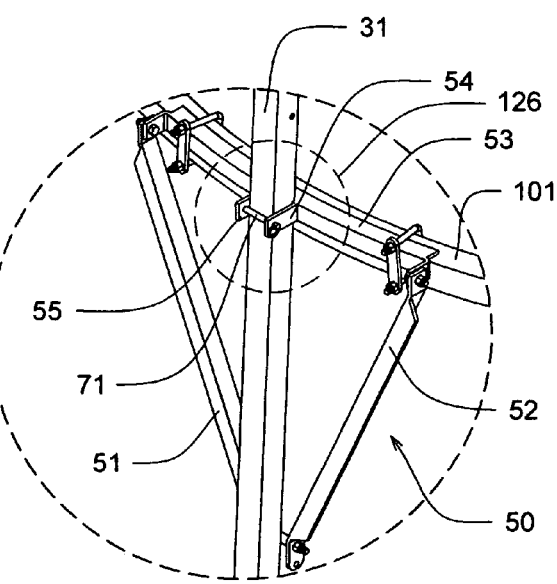
FIG. 16 is an enlarged perspective view showing the lift arm and the lift arm support assembly reconfigured for manual rolling of the feeder.

The present invention is designed to permit conventional manual movement of the feeder 100 by lifting it on its round side and rolling it. FIG. 14 and FIG. 15 show a side elevation view and a perspective view, respectively, of the present invention reconfigured for manual rolling of the feeder 100. In FIG. 15, unrelated components of the feeder 100 have been removed for clarity. FIG. 16 shows an enlarged perspective view of the lift arm 31 and the lift arm support assembly 50 reconfigured for manual rolling of the feeder 100. To reconfigure the present invention for manual rolling of the feeder 100, the quick release pin 71 is removed from the left brace 51, the right brace 52, and the lift arm 31. The left brace 51 and the right brace 52 are then pivoted as a unit in a downward direction until they are vertical. Next, the lift arm 31 is pivoted in an upward direction about the hinge bolt 34 until it rests between the left forward facing lug 55 and the right forward facing lug 54 and against the center portion of the upper coupling bracket 53. The quick release pin 71 is then inserted into the holes in the forward portion of the left forward facing lug 55 and the forward portion of the right forward facing lug 54 to secure the lift arm 31 against the center portion of the upper coupling bracket 53, as more clearly shown in FIG. 16. With the lift arm 31 held in this position, the lift arm support assembly 50 is also secured between the lift arm 31 and the feeder 100 and therefore, cannot pivot or rotate. With the lift arm 31 secured against the upper coupling bracket 53, the feeder 100 can be manually lifted up and onto its round side and then rolled in the same manner as the feeder 100 without the present invention installed.

Description

Figure 17:
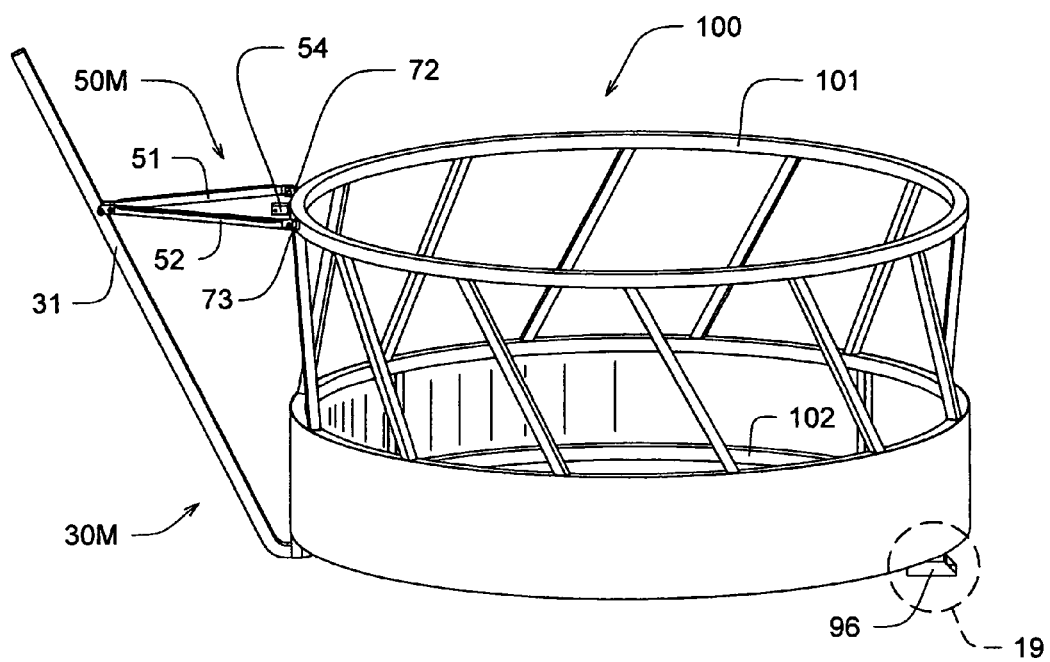
FIG. 17 is a side perspective view showing a first alternate embodiment of the present invention which permanently integrates a modified version of the lift arm assembly, a modified version of the lift arm support assembly, a left anti-slide stabilizing member, and a right anti-slide stabilizing member to the feeder to form a complete stand alone unit.

First Alternate Embodiment—FIG. 17, FIG. 18, and FIG. 19

Referring to FIG. 17, FIG. 18, and FIG. 19, a first alternate embodiment of the present invention is shown. The embodiment integrates a modified lift arm or tilt ramp assembly 30M, a modified lift arm or tilt ramp support assembly 50M, a left anti-slide stabilizing member 97, and a right anti-slide stabilizing member 96 to the feeder 100 during the manufacturing process to form a complete stand alone unit. The modified lift arm assembly 30M is the same as the lift arm assembly 30 with the exception of the elimination of the U-bolts 38 and 42 and their respective U-bolt nuts and U-bolt plates and the elimination of the lower coupling bracket 37. The modified lift arm support assembly 50M is the same as the lift arm support assembly 50 with the exception of the elimination of the U-bolts 58 and 62 and their respective U-bolt nuts and U-bolt plates and the elimination of the center section of the upper coupling bracket 53 but retaining the left forward facing flange 72, the right forward facing flange 73, the left forward facing lug 55, and the right forward facing lug 54. The left anti-slide stabilizing member 97 and the right anti-slide stabilizing member 96 are fabricated from rectangular tubing and have the same basic configuration. The left anti-slide stabilizing member 97 and the right anti-slide stabilizing member 96 perform the same stabilizing and anti-slide functions as the anti-slide stabilizing member 92 of the preferred embodiment. The permanent integration is accomplished by either forming, welding, bolting, or by other connection or integration methods the upper hinge bracket 36, the left anti-slide stabilizing member 97, and the right anti-slide stabilizing member 96 to the bottom ring 102 of the feeder 100 and the left forward facing flange 72, the right forward facing flange 73, the left forward facing lug 55, and the right forward facing lug 54 to the top ring 101 of the feeder 100 at the depicted locations. With the exception of the modified lift arm assembly 30M, the modified lift arm support assembly 50M, the left anti-slide stabilizing member 97, and the right anti-slide stabilizing member 96, the reference numbers and related components depicted in FIG. 17, FIG. 18, and FIG. 19 for the first alternate embodiment are the same as those for the preferred embodiment because they are the same components. The lift arm assembly 30M and the lift arm support assembly 50M can be connected or integrated into to the feeder 100 at the same respective location as with the preferred embodiment, namely, anywhere within areas 120 and 124, respectively, applicable to the first point and third point, respectively. The lift arm support assembly 50M can be connected to the lift arm assembly 30M in the same respective location as with the preferred embodiment, namely, anywhere within area 122, applicable to the second point. In a like manner to the preferred embodiment, the lift arm 31 can be connected to the feeder 100 anywhere within area 126, applicable to the fourth point. It should be understood that while FIG. 17, FIG. 18, and FIG. 19 depict a conventional hay bale feeder with a circular structure, any conventional hay bale feeder with a multi-sided structure of three or more sides is also applicable to the first alternate embodiment.

Operation

First Alternate Embodiment

The first alternate embodiment is operated in the same manner as the preferred embodiment.

Description

Second Alternate Embodiment—FIG. 20 and FIG. 21

Referring to FIG. 20 and FIG. 21, a second alternate embodiment of the present invention is shown. The embodiment integrates a plurality of the modified lift arm assemblies 30M and a plurality of the modified lift arm support assemblies 50M to a conventional hay bale feeder 104, having a multi-sided structure, during the manufacturing process to form a complete stand alone unit. The feeder 104 has a bottom ring 105 that is linearly segmented and has an angled cross section with an outward facing horizontal flange 106. Each modified lift arm assembly 30M and associated modified lift arm support assembly 50M are disposed at a position on the opposite side of the feeder 104 to a linear segment on the bottom ring 105, as depicted in FIG. 20. Since a linear segment on the bottom ring 105 is located on the opposite side of the feeder 104 to one of the modified lift arm assemblies 30M, the horizontal flange 106, can perform the same stabilizing and anti-slide functions as the anti-slide stabilizing member 92 of the preferred embodiment. Each modified lift arm assembly 30M and each modified lift arm support assembly 50M can be connected or integrated to the feeder 104 in the same manner and within the same respective areas 120 and 124, respectively as with the first alternate embodiment. Each lift arm support assembly 50M can be connected to its respective lift arm assembly 30M at the same respective location as with the first alternate embodiment, namely, anywhere within area 122. In a like manner to the first alternate embodiment, each lift arm 31 can be respectively connected to the feeder 104 anywhere within area 126. The reference numbers and related components depicted in FIG. 20 and FIG. 21 for the modified lift arm assembly 30M and the modified lift arm support assembly 50M are the same as those for the first alternate embodiment. It should be understood that while FIG. 20 and FIG. 21 show a conventional hay bale feeder with six sides, three modified lift arm assemblies 30M, and three modified lift arm support assemblies 50M, any conventional hay bale feeder with a multi-sided structure having at least 3 sides and a plurality of lift arm assemblies 30M and a plurality of lift arm support assemblies 50M is applicable to the second alternate embodiment.

Operation

Second Alternate Embodiment

The second alternate embodiment is operated in the same manner as the first alternate embodiment, except that the feeder 104 can be lifted and transported from a plurality of sites.

Description

Third Alternate Embodiment—FIG. 10, FIG. 11, FIG. 12, and FIG. 13

Referring to FIG. 10, FIG. 11, FIG. 12, and FIG. 13, a third alternate embodiment of the present invention is illustrated. The third alternate embodiment defines a method of lifting, transporting, and positioning the hay bale feeder 100 comprising the steps of: providing a device for adapting the hay bale feeder 100, the device being connected to the feeder 100 and comprising the lift arm assembly 30, the lift arm support assembly 50, and the anti-slide stabilizing assembly 80; providing the round hay bale 112; moving the hay bale 112 in a direction toward the lift arm 31 of the lift arm assembly 30; tilting of the hay bale feeder 100 in an upward direction as the lift arm 31 slides up the round hay bale 112 as the round hay bale 112 is moved further in the same direction toward the lift arm 31; moving the round hay bale 112 in the same direction toward the lift arm 31 still further until the lift arm 31 resides on the top of the round hay bale 112; moving the round hay bale 112 in a direction away from the lift arm 31 causing an engagement of the blunt aft end 48 of the lift arm 31 with the round hay bale 112 resulting in the hay bale feeder 100 moving in unison with the round hay bale 112; terminating the movement of the round hay bale 112 at the feeding location; and pushing the hay bale feeder 100 in a direction toward the round hay bale 112 or pushing the round hay bale 112 in the direction toward the lift arm 31 until the feeder falls from the top of the round hay bale 112 and onto the ground 113, resulting in the round hay bale 112 being positioned inside the feeder 100. The point at which the twine on the hay bale 112 is removed was not included in the method because of the dependence of the type of hay and bale tightness of the hay bale 112, as explained in the operation of the preferred embodiment.

Operation

Third Alternate Embodiment

The operation of the third alternate embodiment is explained in the Description—Third Alternate Embodiment, above.

ADVANTAGES OF THE EMBODIMENTS

From the description above, a number of possible advantages of my device and method for lifting and transporting conventional hay bale feeders with a moving conventional round hay bale become evident:

(a) With the use of the device and method, a conventional hay bale feeder can be easily lifted and transported to an alternate feeding site by using only the reverse and forward motion of a conventional round hay bale.

(b) The device creates the possibility of removing the hay bale twine in an area remote from cattle which enhances worker safety.

(c) The device permits lift and transport of conventional hay bale feeders which is not a function of the type of bale carrier used either fork or spear, the type of vehicle that the bale carrier is installed on, the bale carrier lifting height, the type of bale (either round or square) being used, or the orientation of the bale on the bale carrier.

(d) The device and method allows the bale to be moved directly to the feeder and then both the bale and feeder moved to a new feeding location as a unit, which is a one step process.

(e) The device produces a safer environment for cattle because it does not have openings whereby cattle can get caught and permits a slow descent of the feeder down over the bale, while at the same time does not interfere with cattle entering the feeder access openings.

(f) The device can be easily installed in the field on an existing feeder of varying heights or can be permanently integrated into the feeder during manufacture.

(g) The device may lift the feeder off the ground for protection from corrosion.

(h) A conventional hay bale feeder can still be manually moved by rolling it on its side with the device installed or permanently integrated on the feeder.

CONCLUSION

In conclusion, a person of ordinary skill in the art will understand that the device and method for lifting and transporting conventional hay bale feeders of this invention is novel, simple, effective, and inexpensive and will efficiently lift and transport a conventional hay bale feeder when acted upon by the directed movement of a conventional round hay bale. After transporting the feeder to the desired feeding site, a person can easily slide the feeder down and over the bale so that the bale resides within the feeder and is therefore, made ready for the feeding of cattle or the like. As an alternative to manually pushing the feeder down and over the bale, the bale carrier on the tractor or other vehicle can be used to push the feeder down and over the bale and in some cases, push the bale into the feeder until it falls to the ground with the bale inside. Furthermore, the device and method may have one or more of the additional advantages in that the device is independent of both the type of bale carrier used, whether spear or fork, and the vehicle that the bale carrier is used on;

the device will produce feeder lift and transport that is independent of bale carrier lifting height, bale orientation on the bale carrier, and bale type, either round or square;

the device and method will permit the bale to be moved directly to the feeder and then both the bale and feeder transported to the new feeding location as a unit, a one step process;

the device will be safer for cattle in that the downward descent of the feeder over a bale is slower, thereby promoting the safety of small calves and additionally, does not have openings whereby cattle could get caught and subsequently hurt;

the device will not interfere with cattle entering the feeder access openings;

the device will permit traditional manual lifting, rolling, and placement over a bale, if desired;

the device can be easily retrofitted in the field to an existing feeder of varying heights or it can be permanently integrated into a feeder at manufacture resulting in a complete stand alone unit;

the device may permit removing the bale twine in an area remote from cattle, thereby improving worker safety; and the device may raise the feeder off the ground for protection from corrosion.

Although the description above is of the preferred and alternate embodiments, these embodiments should not be construed as limiting the scope of the invention. Many other ramifications and variations are possible within the teachings of the present invention. For example, sizes, shapes, materials, configurations, assembly, design, etc. of all parts can be readily modified or changed; the lift arm 31 can replaced with a plurality of lift arms connected together as a structure or an assembly; the upper end of the lift arm 31 does not have to be straight but can be curved or angled; the lift arm 31 can have widening plates or strips welded or affixed to its front side to reduce the bale contact pressure produced by heavier feeders; the lift arm 31 can be fabricated from a plurality of interconnecting members to reduce the length for shipping; the arcuate section 49 of the lift arm 31 can be eliminated with loss of performance; a pivoting member or assembly can be connected to the lift arm 31 to enhance sliding of the feeder 100 on the top of the hay bale 112 when the feeder 100 is moved in the forward direction and to enhance engagement with the top of the hay bale 112 when the hay bale 112 is moved in the forward direction; unidirectional anti-slide wheels or rollers can be attached to the lower end of the lift arm 31 and/or as a replacement to the anti-slide stabilizing member 92 or the left anti-slide stabilizing member 97 and the right anti-slide stabilizing member 96, to produce more efficient forward movement of the feeder 100 while still providing side to side rocking stability and resistance to rearward feeder 100 movement; the anti-slide flange 93 can be modified to provide more aggressive resistance to rearward feeder 100 movement; the anti-slide stabilizing assembly 80, the left anti-slide stabilizing member 97 and the right anti-slide stabilizing member 96 can be replaced with any structure configured to provide positive rearward ground 113 engagement and side to side rocking stability to the feeder 100; with respect to the preferred embodiment, the anti-slide stabilizing assembly 80 can be replaced with independent left and right anti-slide stabilizing assemblies, on each side of a vertical plane that passes through the lift arm 31 and the center of the feeder 100, that provide positive rearward ground 113 engaging and side to side rocking stability; to reduce cost, the components that provide for the pivoting or rotating capability of the lift arm 31 to a substantially vertical position next to the top portion of the feeder 100 and the feeder 104 can be eliminated and replaced with rigid or non-pivoting structures or components; the lift arm support assembly 50 and the modified lift arm support assembly 50M can be attached at another location on the feeder 100 and the feeder 104, respectively, and/or on the lift arm 31; with respect to the preferred embodiment, the lift arm assembly 30, the lift arm support assembly 50, and the anti-slide stabilizing assembly 80 can be removably attached to the feeder 100 with other types of fasteners, connectors, or hardware; the preferred embodiment can be easily modified for attachment to conventional hay bale feeders with multi-sided structures; the preferred, first alternate, and second alternate embodiments can be proportioned to fit feeders used for feeding hay bales to other types of livestock or animals; with respect to the first alternate embodiment, the left anti-slide stabilizing member 97 and the right anti-slide stabilizing member 96 can be replaced with an elongated anti-slide stabilizing member similar to that of the anti-slide stabilizing member 92 of the anti-slide stabilizing assembly 80; with respect to the first alternate embodiment, a plurality of modified lift arm assemblies 30M, modified lift arm support assemblies 50M, left anti-slide stabilizing members 97, and right anti-slide stabilizing members 96 can be integrated into the feeder 100 at manufacture to produce a stand alone unit; with respect to the first and second alternate embodiments, the feeder 100 and the feeder 104, respectively, can be divided into equal subassemblies, such that when assembled, they assume a substantially cylindrical structure; also, with respect to the first and second alternate embodiments, recessed areas, pockets, or other suitable configurations can be located on the opposite side of the feeder 100 and the feeder 104 to the lift arm assembly 30 or one or each of modified lift arm assemblies 30M, respectively, for the purpose of receiving or coupling the fork ends of the fork bale carrier 111 or the spear end of a spear bale carrier to enable pushing, by a tractor or the like, of the feeder 100 and the feeder 104 down and around the hay bale 112; with respect to the preferred embodiment, adapters with recessions, pockets, or other suitable configurations can be attached at a position on the opposite side of the feeder 100 from the lift arm assembly 30, or integrated into the anti-slide stabilizing assembly 80 for the purpose receiving or coupling the fork ends of the fork bale carrier 111 or the spear end of a spear bale carrier to enable pushing, by a tractor or the like, of the feeder 100 down and around the hay bale 112; etc.

I claim:

1. A hay bale feeder capable of being tilted and transported in association with the directed movement of a conventional hay bale, the feeder comprising:
    (a) a structure configured for enclosing the hay bale having a bottom, a bottom edge, an exterior, a top edge, a bottom portion, and a top portion with said top portion having a plurality of sufficiently sized openings for livestock to access and feed on the hay bale;
    (b) at least one tilt ramp having an upper end and a lower end, said at least one tilt ramp disposed on the outside of said exterior of said structure, said lower end being positioned adjacent to said bottom edge of said structure, said at least one tilt ramp being connected to said structure at a first point and said upper end of said at least one tilt ramp extending towards said top edge of said structure in a spaced relationship thereto, such that said at least one tilt ramp forms an acute angle with respect to said exterior of said structure;
    (c) at least one brace connecting to said at least one tilt ramp at a second point, above said first point, and to said structure at a third point, above said first point, in said spaced relationship thereto; and
    (d) at least one stabilizing member connected to said structure, said at least one stabilizing member being positioned adjacent to said bottom of said structure apart from said at least one tilt ramp, said at least one stabilizing member configured to limit sliding movement of said structure with respect to the ground in a reverse direction, defined as a said tilt ramp to said at least one stabilizing member direction, permit sliding movement with respect to the ground in a forward direction, opposite from said reverse direction, and limit rocking movement with respect to the ground in a side to side direction;
    wherein directing the movement of the hay bale in said reverse direction against said at least one tilt ramp results in the upward tilting of said structure until said lower end of said tilt ramp is located on the top of the hay bale and an engagement of said lower end of said tilt ramp with the hay bale upon movement of the hay bale in said forward direction, said engagement sufficient to permit the transport of said structure when the hay bale is moved in said forward direction.

2. The feeder of claim 1 further including, an attachment means for removably securing said at least one tilt ramp to said structure at a fourth point, above said first point and wherein:
    (a) said at least one brace is pivotably connected to said structure at said third point and removably connected to said at least one lift arm at said second point,
    (b) said at least one tilt ramp is pivotably connected to said structure at said first point,
    whereby said at least one brace can be pivoted downwardly to a substantially vertical position and then said at least one tilt ramp pivoted upwardly and secured to said structure at said fourth point, thereby permitting said structure to be manually lifted and rolled on said exterior.

3. The feeder of claim 1 further including an arcuate section in said lower end of said tilt ramp configured to permit easy sliding of said structure on the top of the hay bale in said forward direction and to optimize said engagement with the hay bale when the hay bale is moved in said forward direction and wherein said at least one tilt ramp has a length such that the installed vertical height of said at least one tilt ramp is greater than the height of the hay bale.

4. The feeder of claim 1 wherein said at least one stabilizing member is disposed at a position substantially on the opposite side of said structure to said tilt ramp.

5. The feeder of claim 1 wherein said bottom portion of said structure further includes a panel that supports the containment of loose hay.

* * * * *